Feb. 26, 1935. H. B. VINCENT 1,992,453
APPARATUS FOR DETERMINING THE LOUDNESS OF
SOUNDS EMITTED FROM MECHANICAL DEVICES
Filed May 16, 1931 2 Sheets-Sheet 1

INVENTOR:
Howard B. Vincent
HIS ATTORNEYS.

Feb. 26, 1935.    H. B. VINCENT    1,992,453
APPARATUS FOR DETERMINING THE LOUDNESS OF
SOUNDS EMITTED FROM MECHANICAL DEVICES
Filed May 16, 1931    2 Sheets-Sheet 2
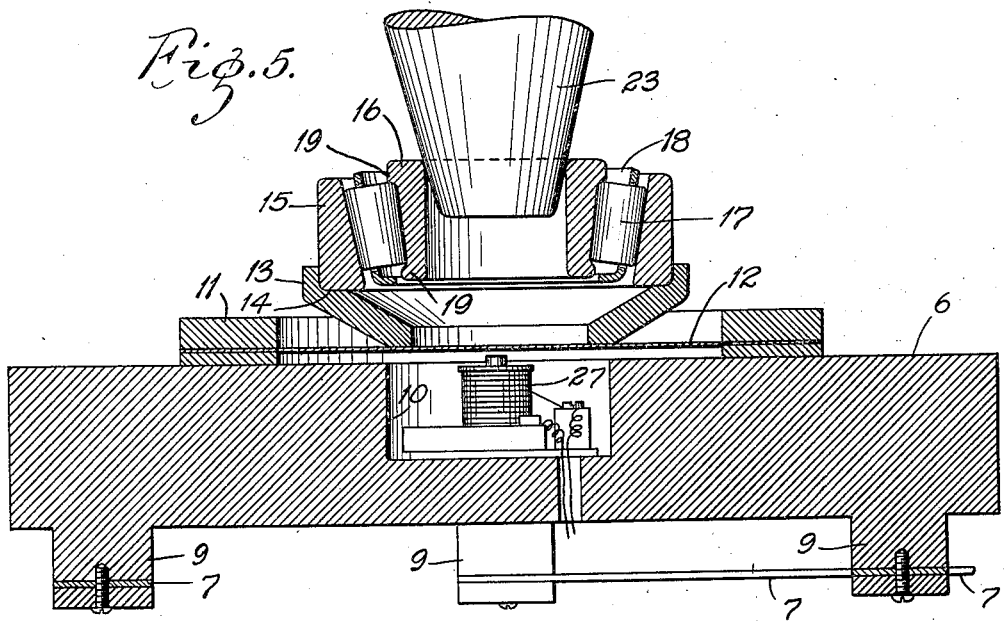
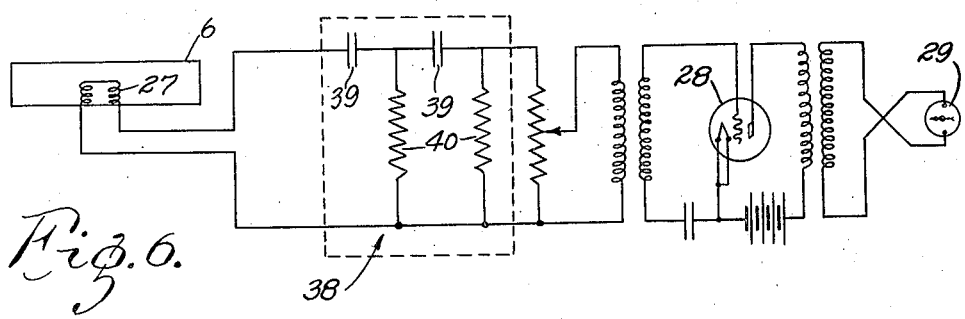

Patented Feb. 26, 1935

1,992,453

UNITED STATES PATENT OFFICE 1,992,453

APPARATUS FOR DETERMINING THE LOUDNESS OF SOUNDS EMITTED FROM MECHANICAL DEVICES

Harvard B. Vincent, Ann Arbor, Mich.

Application May 16, 1931, Serial No. 537,882

12 Claims. (Cl. 73—51)

This invention relates to apparatus for inspecting roller bearings, gears and other mechanical devices that produce noise. It has been found that the most important notes emitted from such devices lie within a certain frequency range; for example, roller bearings produce sounds due to defects therein having vibration frequencies which lie between 100 cycles to 1400 cycles per second. One of the principal objects of the present invention is to devise an apparatus that will be uniformly sensitive to all frequencies within a definite frequency range, and that will determine the loudness of sound produced by defects in such devices. Another object is to arrange such apparatus so that its response to sound vibrations closely simulates that of the human ear.

The invention consists principally in testing apparatus in which the device to be tested, for instance, a roller bearing is mounted on a work support resting on a vibratile diaphragm in such manner that vibrations of the bearing are transmitted to the diaphragm, said diaphragm being mounted on a resiliently mounted substantially non-resilient body, and measuring the relative vibrations between said diaphragm and said body. It also consists in electromagnetic means actuated by said diaphragm for indicating the intensities of vibrations thereof, said electromagnetic means including an electrical weighting net work to give it a frequency characteristic closely approximating that of the human ear and to filter out resonance frequencies of the supporting parts of the apparatus; and by apportioning the various weights and stiffness of the parts, the natural frequencies thereof are made to lie without the working frequency range of the bearing. My invention also consists in the apparatus and in the parts and combinations hereinafter described and claimed.

Figure 1:
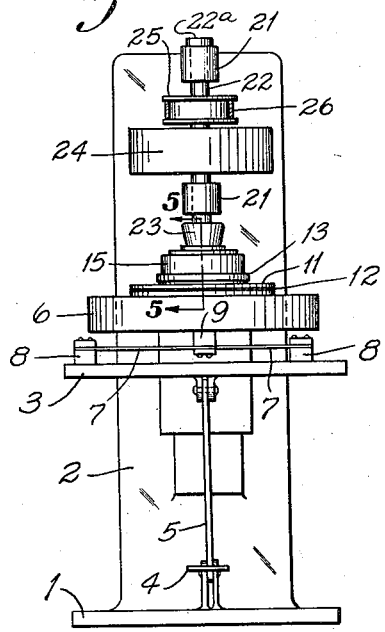
Figure 2:
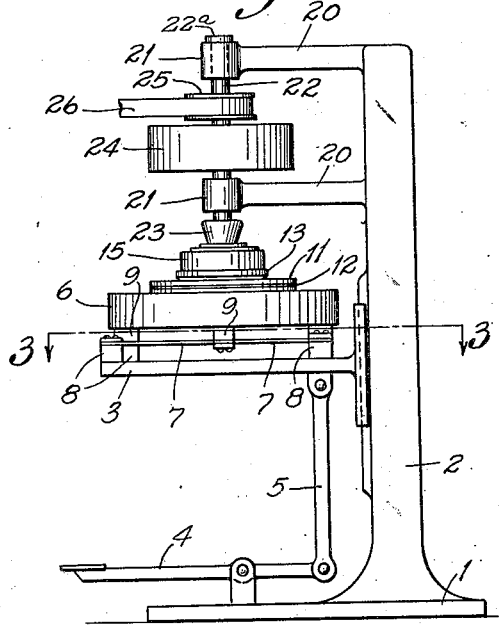
Figure 4:
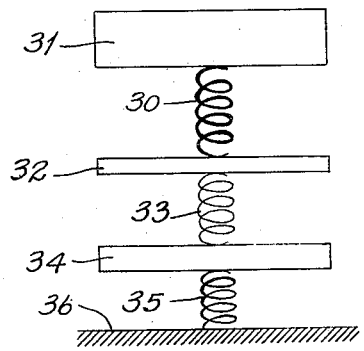
Figure 3:
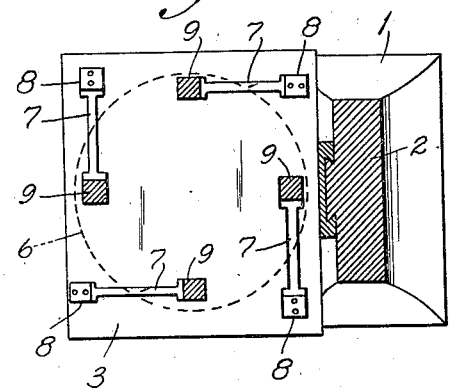

In the accompanying drawings, which form part of this specification and wherein like reference numerals refer to like parts wherever they occur, Fig. 1 is a front view of apparatus embodying my invention, Fig. 2 is a side view of the apparatus shown in Fig. 1, Fig. 3 is a horizontal sectional view along the line 3—3 in Fig. 2, Fig. 4 is a diagrammatic view of the various parts of the apparatus showing blocks supported on coil springs, the blocks representing the respective weights of the parts of the apparatus proportionately and the coil springs representing the resiliency or stiffness of the parts proportionately, Fig. 5 is an enlarged sectional view along the line 5—5 in Fig. 1; and Fig. 6 is a diagrammatic view of the electromagnetic means for measuring and indicating the sound vibrations showing the electrical net work (surrounded by dotted lines) which corrects for resonance frequencies of the supporting parts of the apparatus and also corrects for ear sensitivity.

In the construction illustrated, I have shown apparatus for inspecting roller bearings comprising a base 1 having an upright member 2 extending therefrom near one end.

Slidably mounted on said upright member is a horizontal table member 3 and vertical movement thereof for varying its height is accomplished by means of a simple foot lever 4 fulcrumed on the base 1 and having its one end connected to the lower end of a vertically disposed arm 5 whose upper end is connected to the bottom of the table 3. A relatively heavy substantially non-resilient circular member or body 6 (hereinafter termed the microphone mass) is supported on the ends of four leaf springs 7 mounted on the bottom of the microphone mass. Each of said leaf springs 7 is mounted on a block 8 provided at the respective corners of the table and extending parallel to the respective side thereof and having its end secured to one of four blocks 9 projecting from around the under side of the microphone mass near the outer edge thereof.

Centrally located in the top of the microphone mass 6 is a circular recess 10; and mounted on top of the microphone mass concentrically around said recess is an annular ring 11 provided with a vibratile diaphragm member 12 which is spaced a slight distance from the top of the microphone mass. Mounted on the top of the diaphragm 12 is a work support 13 in the form of an inverted conical shaped ring having an annular ledge 14 near its top forming an annular recess adapted to receive a test conical bearing cup 15 having its larger end resting on the annular ledge 14. Cooperating with the cup 15 is a cone 16 around which is mounted a series of rollers 17 in a cage 18, the rollers 17 being interposed between the cup 15 and cone 16; and the raceway of the cone is defined by annular ribs 19 at both ends thereof.

Two horizontal brackets 20 extending from the upright member 2, one above the other and overhanging the table 3 are provided with vertical bearings 21 in their ends. Mounted in said bearings 21 is a small shaft or spindle 22 having a conical nose or head portion 23 on its lower end adapted to extend part way into the bore of the cone until it seats itself on the top rim of the cone; and a relatively large fly wheel 24 is rigidly mounted on the shaft 22 between the two brackets 20 to insure frictional contact between the spindle nose 23 and the cone and to exert a pressure on the bearings for reasons hereinafter disclosed. The bearing cone is rotated by means of a pulley 25 rigidly mounted on the shaft 22 and driven by a belt 26 which in turn is operatively connected to a suitable source of power for driving the bearing at the various speeds it will encounter when installed in a mechanism, and the shaft 22 has an enlarged upper end portion 22a for preventing the fly wheel 24 from resting on the lower bracket arm 20 when a bearing is not in position to be tested.

Mounted in the central recess 10 of the microphone mass 6 is a magnet 27 in position to have the diaphragm act as an armature therefor; and the means and apparatus for indicating vibrations thereof is similar to that disclosed and claimed in the copending application of Floyd A. Firestone, Serial No. 82,629 for measuring the vibrations of mechanical devices. The diaphragm, the microphone mass, and the magnet constitute a microphone whose structure is analogous to that of a telephone receiver, differing only in size therefrom; and operatively coupled to the microphone is an amplifier 28 and galvanometer 29 for measuring and indicating the intensities of the vibrations of the diaphragm along the lines disclosed and fully explained in the above mentioned co-pending application.

Likewise, the manner in which the bearings are tested for the purpose of passing or rejecting them is similar to the method disclosed and claimed in the Floyd A. Firestone et al. co-pending application Serial No. 402,260 for vibration responsive apparatus of which I am a joint inventor. The operation of testing a bearing may be summarized as follows: A proper size work support is selected for the bearing to be tested. By operating the foot lever 4 the table 3 is lowered until sufficient room is obtained for assembling the bearing on the work support. After positioning the roller bearing, the table is moved upwardly by means of the foot lever 4 until the spindle nose 23 seats itself firmly on the circumference of the cone 16. The weight of the entire driving mechanism is then raised a slight distance above this position to insure a constant bearing load during the test. The cone is then rotated at varying speeds corresponding to the speeds it will encounter in practical installation, and the sound intensities are indicated on the galvanometer 29. Obviously, arbitrary limits may be set on the face of the galvanometer for passing or rejecting a bearing as fully described and claimed in the above mentioned co-pending application Serial No. 402,260.

The present invention is an improvement in the apparatus disclosed in the above mentioned co-pending applications. In testing bearings along the lines disclosed in such applications, the microphone was more sensitive to some frequencies than to others which I have found was caused by resonance frequencies of various parts of the apparatus lying within the prescribed working range of frequencies for which the apparatus was designed. This difficulty is avoided by the present invention. The bearing itself, when mounted for testing, behaves as a stiff spring due to elastic deformations of the various parts thereof; and referring to Fig. 4, the bearing stiffness is represented by a relatively heavy coil spring 30 which supports a block 31 which represents the weight of the fly wheel. Likewise, the weight of the bearings, work support, and diaphragm, which may be considered as one mass, is represented by a block 32 supporting the coil spring 30. Supporting said block 32 is a coil spring 33 representing the stiffness of the diaphragm; and the coil spring 33 is supported on a block 34 representing the microphone mass; and the block 34 is in turn mounted on a coil spring 35 representing the stiffness of the leaf springs, and the coil spring 35 extends from a base 36 representing the table 3. Obviously, the microphone magnets which are placed on the microphone mass are responsive to relative vibrations of the diaphragm with respect to the microphone mass. By apportioning the weights and stiffnesses of the various parts of the apparatus it is possible to provide apparatus wherein the resonance frequencies of the microphone mass and the work support will not fall within the desired working frequency range for roller bearings, for example, 100 to 1400 cycles per second. Considering the fly wheel as a comparatively massive body which will be at all times stationary so far as vibrations are concerned, it is obvious from Fig. 4 that the bearing cup and work support will have a resonance frequency which depends on the mass thereof and on the combined stiffness of the bearing and diaphragm. I have found that by using a work support made of light metal such as aluminum, and as thin as practicable, the combined weights of the bearing cup and work support can be kept to such value that taken together with the comparatively large stiffness of the bearing they will have a high natural vibration frequency which lies above the working vibration frequency range of the apparatus.

The stiffness of the diaphragm may be considered as negligible in comparison with that of the bearing; and obviously as far as vibrations of the microphone mass with respect to the fly wheel are concerned the work support may be considered as a fixed point and the microphone mass will then have a natural vibration frequency which depends on its weight and on the combined stiffness of the diaphragm and of the leaf springs. Consequently, by using a comparatively heavy microphone mass and a relatively heavy fly wheel and so selecting the stiffness of the diaphragm and the leaf springs, the microphone mass will resonate at a comparatively low frequency which can be made to lie below the working frequency range of the apparatus. Thus, it is noted that the work support resonates above the working frequency range and the microphone mass resonates below the range.

It has been found that the ear is more sensitive to higher vibration frequencies than to lower ones, and in order for the response of the apparatus to simulate that of the ear corrections for the change with frequency in the sensitivity of the ear must be made. This is accomplished by an electrical "weighting" net work 38 which is introduced in the microphone circuit and one type of which is diagrammatically illustrated in Fig. 6. The electrical net work illustrated includes condensers 39 and resistance 40 whose magnitudes thereof can be varied to give the net work a frequency characteristic closely approximating that of the ear and it is obvious that anyone versed in the well known principles of radio would be able to modify this particular network, and still obtain the same results. Obviously, such a network would pass the higher frequencies better than the lower frequencies analogous to the response of the ear; and the reading on the galvanometer, would indicate the loudness of the sound to an average ear.

The principal novel features of my invention are the measurement of the relative velocity between the microphone mass and the work support, each of which is mounted in such manner that their resonance frequencies lie outside the working frequency range of a roller bearing; and the correction of these velocity measurements by an electrical network which takes into account the sensitivity of the ear to sounds of different frequencies.

One of the principal advantages of my invention is the provision of a simple apparatus in which the vibrating parts may be easily reproduced so that the various parts of the apparatus may be readily duplicated whereby a plurality of devices may be constructed which will have identical characteristics causing them to perform in a similar manner.

As numerous changes may be made in the construction illustrated without departing from the spirit of my invention, I do not wish to be limited to the precise construction shown and described.

What I claim is:

1. Apparatus for testing mechanical devices for noise comprising a base, a substantially non-resilient member resiliently mounted thereon, a vibratile member mounted on said resiliently mounted member, a work support for a mechanical device resting on said vibratile member, means for exerting pressure on said mechanical device to maintain contact between it and the work support and means for measuring vibrations of the vibratile member relative to said resiliently mounted member.

2. Apparatus for testing roller bearings and the like comprising a base, a substantially non-resilient body resiliently mounted thereon, a diaphragm mounted on said non-resilient member, a work support for a roller bearing resting on said diaphragm, means for exerting pressure on said roller bearing so as to transmit vibrations of the bearing through the work support to the diaphragm, and means for measuring vibrations of said diaphragm member relative to said resiliently mounted body.

3. Apparatus for testing roller bearings and the like comprising a base, supporting means for a mechanical device to be tested mounted on said base and having a natural vibration frequency outside the vibration frequency range of important sounds emitted from said mechanical device, an electro-magnet in position to have a part of said supporting means act as an armature therefor, and electrical means coupled to said electro magnet to indicate the vibrations of said mechanical device.

4. Apparatus for testing roller bearings and the like comprising a base, supporting means for a mechanical device to be tested mounted on said base and having a natural vibration frequency outside the vibration frequency range of important sounds emitted from said mechanical device, an electro-magnet in position to have a part of said supporting means act as an armature therefor, electrical means coupled to said electromagnet to indicate the vibrations of said mechanical device, said indicating means including an electrical network for filtering out voltages at frequencies equal to those of the natural vibration frequencies of the supporting means.

5. Apparatus for testing roller bearings and the like comprising a base, supporting means for a mechanical device to be tested mounted on said base and having a natural vibration frequency outside the vibration frequency range of important sounds emitted from said mechanical device, an electro-magnet in position to have a part of said supporting means act as an armature therefor, electrical means coupled to said electro-magnet to indicate the vibrations of said mechanical device, said indicating means including an electrical network and an amplifier which attenuates different frequencies by different amounts.

6. Apparatus for testing roller bearings and the like comprising a base for said apparatus, a work support for a roller bearing, means for driving said roller bearing to produce sound vibrations thereof, a vibratile member supporting said work support in such manner that the natural vibration frequency of the work support is above the vibration frequency range of important bearing noises in the roller bearing, a substantially non-resilient heavy body mounted on said base and supporting said diaphragm in such manner that the natural vibration frequency of said body is below said frequency range of important noises, and electro-magnetic means for measuring vibrations of said vibratile member relative to said non-resilient body, said electro-magnetic means including an electric network for filtering out wave frequencies equal to the resonance frequencies of the work support and non-resilient body.

7. Apparatus for testing roller bearings and the like comprising a base for said apparatus, springs mounted thereon, a non-resilient body mounted on said springs, said body being comparatively heavy with respect to the stiffness of said springs whereby the natural vibration frequency of the body and springs is comparatively low, a diaphragm on said body, a work support for a roller bearing resting on said diaphragm, means for forcing said roller bearing and said work support against said diaphragm whereby the vibrations of said bearing are transmitted to said diaphragm, means for driving said roller bearing, and means for measuring vibrations of said diaphragm relative to said non-resilient body.

8. Apparatus for testing roller bearings and the like comprising a base for said apparatus, springs mounted thereon, a non-resilient body mounted on said springs, said body being comparatively heavy with respect to the stiffness of said springs whereby the natural vibration frequency of the body and springs is comparatively low, a diaphragm on said body, a work support for a roller bearing resting on said diaphragm, means for forcing said roller bearing and said work support against said diaphragm, the work support being comparatively light with respect to the stiffness of the bearing so that the natural vibration frequency of the work support is comparatively higher than that of the important sound vibrations emitted from said roller bearing, means for driving said roller bearing and means for measuring vibrations of said diaphragm relative to said non-resilient body.

9. Apparatus for testing roller bearings and the like, comprising a base, extremely resilient members mounted thereon, a non-resilient body mounted on said resilient members, a recess provided in said body, a diaphragm mounted on the top of said body adjacent to said recess, a work support for a roller bearing mounted on said diaphragm, a weighted shaft mounted on said base and adapted to rotate said roller bearing by frictional contact therewith and to exert a pressure on said bearing, electromagnetic means for indicating vibrations of said diaphragm relative to said non-resilient body comprising magnets mounted in said recess in position to have said diaphragm act as an armature, a circuit containing a winding around said magnets and electrical measuring means operatively coupled to said circuit.

10. Apparatus for testing roller bearings and the like comprising a stand, a horizontal table slidably mounted thereon, means for raising and lowering said table, leaf springs mounted on said table, a stiff body supported on said springs, a recess provided in said body, an annular ring mounted on the top of said body and having a diaphragm located adjacent to said recess and spaced from the top of said body, a work support for a roller bearing resting on said diaphragm, means for driving said roller bearing, a magnet mounted in said recess in position to have the diaphragm act as an armature therefor, a circuit containing a winding around said magnet and having a wave filter inserted therein, a circuit containing an electric measuring instrument and an intermediate circuit coupled to said above mentioned circuits and containing an amplifier.

11. Apparatus for testing mechanical devices for noise comprising a base, a mass resiliently mounted on said base, a vibratile member mounted on said mass, a work support for a mechanical device resting on said vibratile member whereby vibrations of said mechanical device are transmitted to said vibratile member, a magnet in position to have the vibratile member act as an armature therefor, an electric circuit containing a winding around said magnet, a circuit containing an electric measuring instrument and an intermediate circuit coupled to said above mentioned circuits and containing an amplifier, said electro-magnetic circuit including an electric network which attenuates different frequencies by different amounts.

12. Apparatus for testing mechanical devices for noise comprising a base, a mass resiliently mounted thereon, a vibratile member mounted on said mass, a work support for a mechanical device to be tested contacting with said vibratile member, means for maintaining such contact, and means for measuring the vibrations of said vibratile member relative to said resiliently mounted body.

HARVARD B. VINCENT.